Feb. 12, 1963

W. E. KENTOR 3,077,215

MEAT CUBING MACHINE

Filed March 28, 1960

Inventor
William E. Kentor by Hill, Sherman, Meroni, Gross & Simpson

Attys.

Feb. 12, 1963 W. E. KENTOR 3,077,215
MEAT CUBING MACHINE
Filed March 28, 1960 4 Sheets-Sheet 4

Inventor
William E. Kentor
Attys.

United States Patent Office 3,077,215
Patented Feb. 12, 1963

3,077,215
MEAT CUBING MACHINE
William E. Kentor, 586 Melody Lane, Highland Park, Ill.
Filed Mar. 28, 1960, Ser. No. 17,874
11 Claims. (Cl. 146—78)

This invention relates generally to a cutting machine and more particularly to a machine for slitting frozen meat so as to divide that meat into cube-like pieces.

The present invention concerns the development of an apparatus for cubing relatively hard frozen stew meat as compared with relatively soft un-frozen stew meat. The apparatus is provided with a conveyor being associated with two rows of cutting knives having beveled staggered meat cutting or slicing edges. By this arrangement only limited areas of the frozen meat are cut at any one time thereby enabling the hard frozen meat to be cut in a continuous uninterrupted operation without breaking or damaging the knives. Through the use of a slicing apparatus of this type, the frozen meat may be cut into cube-like pieces in a manner whereby there is little or no meat dust loss during the cutting operation.

Previous types of cutting machines have been designed exclusively for a purpose of cubing fresh meats and similar food items. The present apparatus, on the other hand, is designed for cubing of frozen meats, which involves the resolution of entirely different problems. Experience has shown that multiple knives disposed along a common axis will not enter a frozen block of meat because of the fact that frozen meat is non-compressible. Any blade which operates on a "slitting" basis must be sharpened so that the entering edge of the knife is considerably thinner than the stock section of the knife. This is accomplished by placing a considerable bevel to the leading edge of the knife.

Prior to this invention, when two or more knives have been simultaneously directed against a block of frozen meat, the knives will not cut the meat and they will very likely break.

Formerly the only known way that knives on a common axis could simultaneously enter frozen meat was to design a knife with a saw type edge so that a swath could be cut through the meat. This type of operation is impractical because of the high percentage of meat dust loss which occurs in a sawing operation as contrasted to a slitting operation.

Accordingly, an important object of the present invention is to provide an improved apparatus for dividing frozen meat into cube-like pieces.

Another important object of this invention is to provide a new and improved low cost apparatus for dividing frozen meat into cube-like pieces by means of a slitting operation to minimize meat dust loss.

According to the general features of the present invention there is provided in a meat cubing machine which has a cutting table-like area and a knife structure on the machine including longitudinal and transverse rows of knives disposed generally at right angles with respect to one another, the longitudinal and transverse knives being movable through the cutting area for cutting a slab of frozen meat into cube-like pieces.

According to other features of the present invention, each of the knives described above has a beveled cutting edge for a cutting area, the cutting edges on the longitudinal rows of knives being disposed between the cutting area and the cutting edges on the tranverse rows of knives.

According to still another feature of the present invention, each of the above knives is V-shaped or shaped in the manner of a V so that maximum pressure can be exerted on one area of the frozen product being cut, with the expenditure of a minimum amount of power by the machine.

A further feature of the knives concerns the manner in which the cutting edges are beveled to serve novel, dual purposes to facilitate entry of the knives into the frozen product and to displace the meat outward from the center of cutting area to permit the free passage of the knives through the frozen product during all stages of the descent of the cutting head or carriage.

Yet another feature of the present invention relates to the knives in each of the rows being staggered and arranged in the shape of a V, the cutting edge of the blades at the bottom of each of the V's being beveled on both sides.

Other objects and features of the present invention will more fully become apparent in view of the following detailed description taken in conjunction with the accompanying drawings illustrating therein a single embodiment, and in which.

As shown on the drawings.

Figure 1:
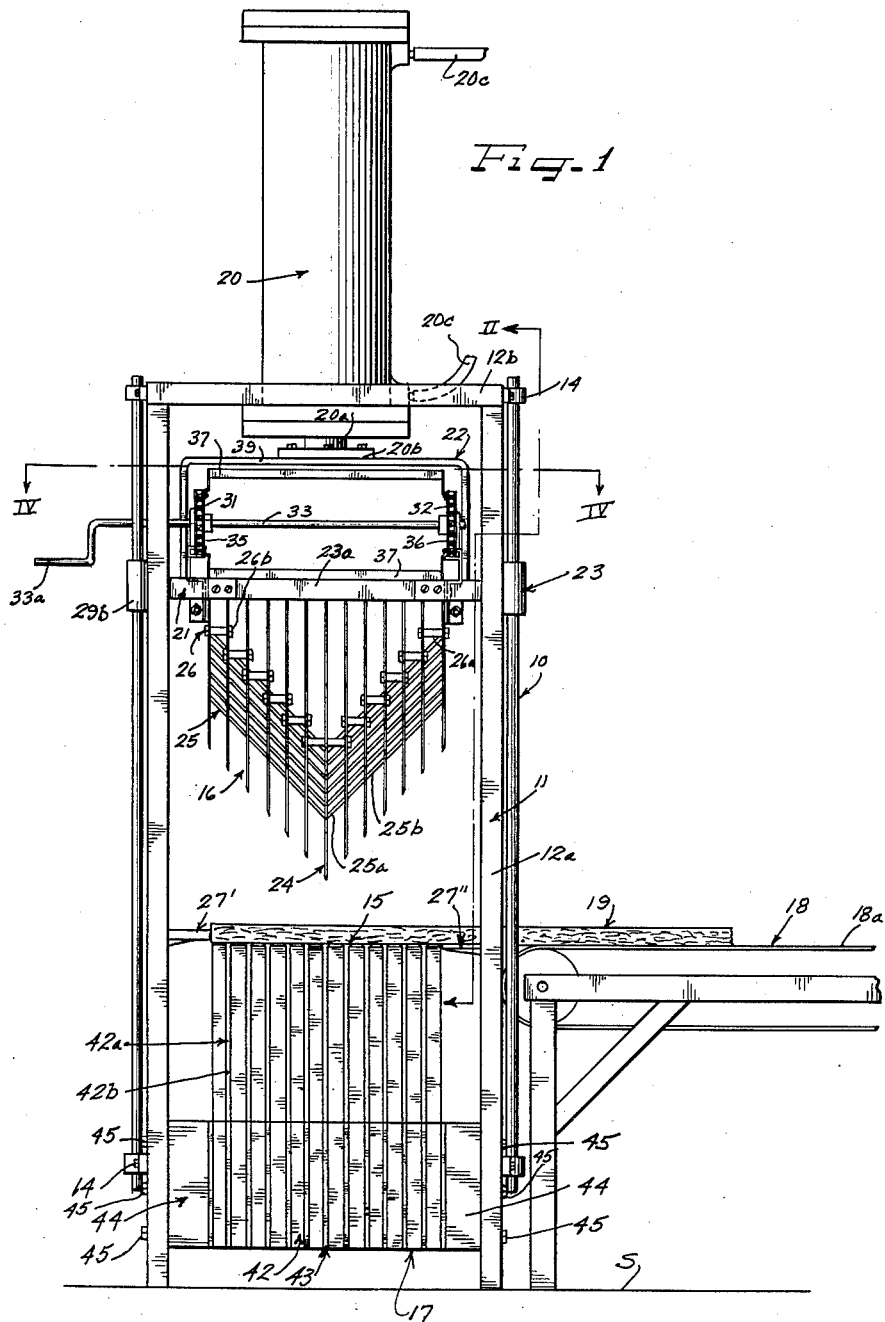
FIGURE 1 is a fragmentary front elevation of a meat cubing machine in accordance with the principles of the present invention.

The reference numeral 10 indicates generally a frozen meat cutting device or machine for dividing a slab of frozen meat into cut pieces such as cube-like pieces or cubes.

The machine 10 includes a main frame structure 11 having an open-ended type of box frame structure indicated generally at 12. The frame structure 12 is provided with vertical and horizontal main frame angles 12a and 12b which are joined together at the closed end of the main frame 12 by any suitable means such as welding and the like. The bottom end or open end of the main frame 12 is adapted to be supported upon a ground surface as indicated at S in FIGURE 1. Mounted upon the frame 12 and constituting a part of the frame structure 11 are pairs of vertically extending bearing rods 13—13. Suitable fasteners 14 are provided for attaching the bearing rods 13 to the frame structure 11.

The machine 10 is also provided with a cutting area or surface 15. Mounted above or to one side of the cutting area 15 is a knife structure 16. Mounted below or on the other side of the cutting area 15 is guide means or guide structure 17. Disposed to one side of the cutting area 15 is a conveyor structure 18 which is adapted to transport slabs of frozen meat, such as is indicated at 19, to the cutting area at 15.

Supported upon the frame structure 11 and more particularly upon the open ended type frame 12 is a means for actuating the knife structure 16 which may be of any suitable type and is here illustrated as a hydraulic cylinder 20. The cylinder 20 has a piston rod 20a bolted to the knife structure 16 generally at 20b. The knife structure 16 actually comprises only part of a slidable carriage structure 21, the carriage structure also being provided with sweeper structure or sweeper means indicated generally at 22. The carriage structure 21 including the knife structure 16 and the sweeper structure 22 are all mounted on bearings, as indicated at 23' so as to enable the carriage structure 21 as well as the knife structure and the sweeper structure to move vertically or transversely relative to the cutting area 15. The hydraulic cylinder 20 constitutes the means for moving the carriage structure 21 as well as the knife structure and the sweeper means relative to the cutting area by moving the carriage structure 21 on its bearings 23'. Fluid lines 20c—20c may be connected to a suitable type of hydraulic system provided with suitable control valves to assist in the operation of the machine 10.

The carriage 21 includes a rectangular carriage frame member 23 which is comprised of a pair of angles 23a and a pair of strips 23b, which strips and angles are suitably secured together such as by means of welding and the like. The angles 23a are disposed generally parallel to the sweeper mechanism 22 and have the purpose of extending over the guide structure 17 to such an extent that they stop the downward movement of the cutting head at the completion of the downstroke. The pair of strips 23b are disposed generally at right angles to the sweeper mechanism 22 in order that no obstruction shall be presented to sweeper paddles 37 when they are transported across the face of the cutting area. It is for this reason that strips are used instead of angles on two of the sides of the rectangular carriage frame 23.

The knife structure 16 is attached to the rectangular carriage frame member 23 in a manner hereafter described. The knife structure 16 includes a series of or rows of longitudinal and transverse cutting knives or elements 24 and 25.

The longitudinal cutting elements 24 are of a generally channelled or V-shaped configuration in order to allow the rows of transverse knives to be bodily telescoped and mounted inside the channelled area of the rows of longitudinal knives. The elements are provided with spacer means 26 for spacing them apart which in each instance comprises a tubular sleeve 26a and a nut and bolt assembly 26b. The tubular sleeve 26a is aligned with confronting openings (not shown) on adjacent blades and the bolt is extended through the adjacent knives and the sleeve with the bolt and nut assembly 26b securing the knives 24 in longitudinally spaced relation. The upper ends of the generally U or V-shaped cutting elements are secured to the rectangular carriage frame member 23 by means of a pair of nut and bolt assemblies 27.

The knives 24 and 25 include center knives 24a and 25a which have V-shaped beveled cutting edges 24b and 25b which are beveled on both sides to displace the meat away from the opposite sides of the center knives 24a and 25a. The other of the knives 24 and 25 also have V-shaped cutting edges 24b and 25b which are beveled on only one of their sides, on the sides facing away from the associated center knife, to displace the meat away from the center knives to facilitate the frozen meat cutting operation.

The longitudinal knives 24 are mounted between the transverse knives 25 and the cutting area 15 with the transverse knives also being mounted on the carriage frame member 23. Each of the transverse blades 25 is also a flat type blade as was the case with the blades 24. The blades 25 differ from the blades 24 in that they are not channelled but comprise plates having offset ears 25c on opposite sides at the upper ends which serves a novel dual function. The ears provide means for connecting the plates to the member 23 and operate as cam means to deflect meat guides 27' and 27". The meat guides are deflected to permit the knives 24 and 25 to pass completely through the frozen meat 19 so the sweeper means may remove the cubed pieces from the cutting area 15 before the knife structure 16 is retracted into normal position above the cutting area 15.

Figure 2:
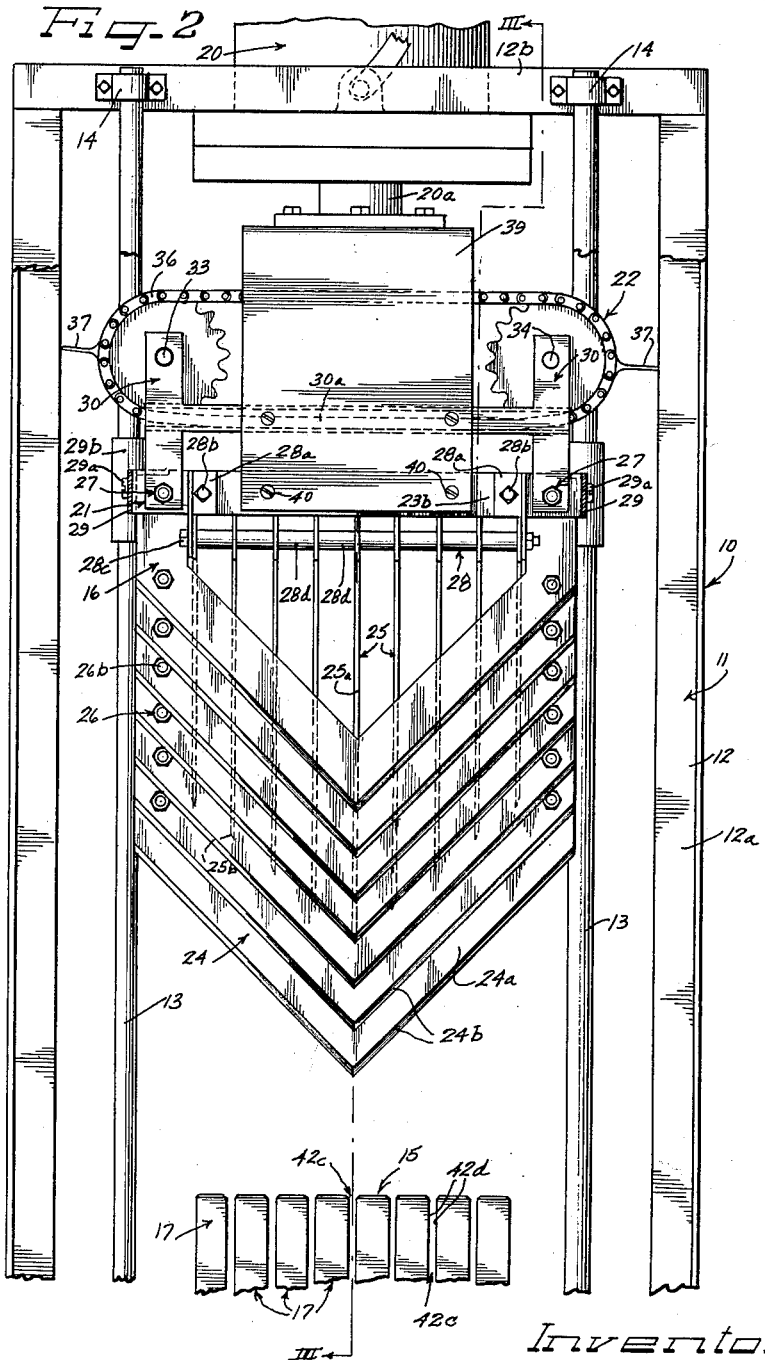
FIGURE 2 is an enlarged fragmentary view of the meat cubing machine, partially in section, as seen on the line II—II in FIGURE 1, the knives being shown in a normal or open position.

Mounting and spacer means 28 is provided to attach the transverse blades 25 in spaced assembly with the carriage frame member 23. To this end four angle brackets 28 are suitably attached at 28b to the strips 23b on the carriage frame member 23 at four spaced intervals about the outer periphery thereof. The angle brackets and the blades 25 have openings (not shown) which are maintained in alignment when held in assembly by a pair of nut and bolt assemblies 28c (FIGURE 2). Tubular sleeves 28d are disposed between the blades 25 and are carried in assembly therewith by the nut and bolt assemblies 28c to maintain the desired spacing between the blades 25.

The blades 24 and 25 are so constructed that their cutting edges 24b and 25b are stagged relative to the center knives 24a and 25b or arranged in V's to allow the frozen meats to be progressively cut thereby enabling the meat to be displaced as it is cut to prevent damage to the blades 24 and 25. The progressive or staggered cutting of the frozen meat slab is essential to the successful operation of the instant frozen meat cubing machine which machine and cutting method embodies principal features of the present invention.

Carriage frame bearing brackets 29 are secured to the angles 23a on the carriage frame member 23 by suitable fasteners 29a at the four corners of the carriage frame member 23. These brackets 29 extend away from the carriage frame member and are provided with tubular bearing sleeves 29b which are in slidable assembly with the vertical frame rods 13 and together comprise bearing means on which the carriage structure as well as the knife and sweeper structure are movable vertical relative to the cutting area 15.

The sweeper means 22 is also mounted on the carriage frame member 23 and includes a pair of I-shaped sweeper mounting brackets 30, 30 which are secured to the carriage frame member by the nut and bolt assemblies 28 at the four corners of the carriage frame member. The brackets 30, 30 are co-planar with the knives 24. Pairs of chain sprockets 31 and 32 are mounted on rods 33 and 34 which are journaled on the brackets 30, 30. The sprockets 31 and 32 are joined together by link type chains 35 and 36. Sweeper flights 37, 37 are mounted between the chains 35 and 36 and suitably secured in assembly as at 38. The rod 33 has a handle or crank extension 33a to cause the flights 37, 37 to move in an orbit relative to the cutting area 15 to sweep the cutting area 15 free of frozen pieces when the top edges of the knives 24 and 25 are disposed below or in the horizontal plane of the cutting area 15.

Figure 3:
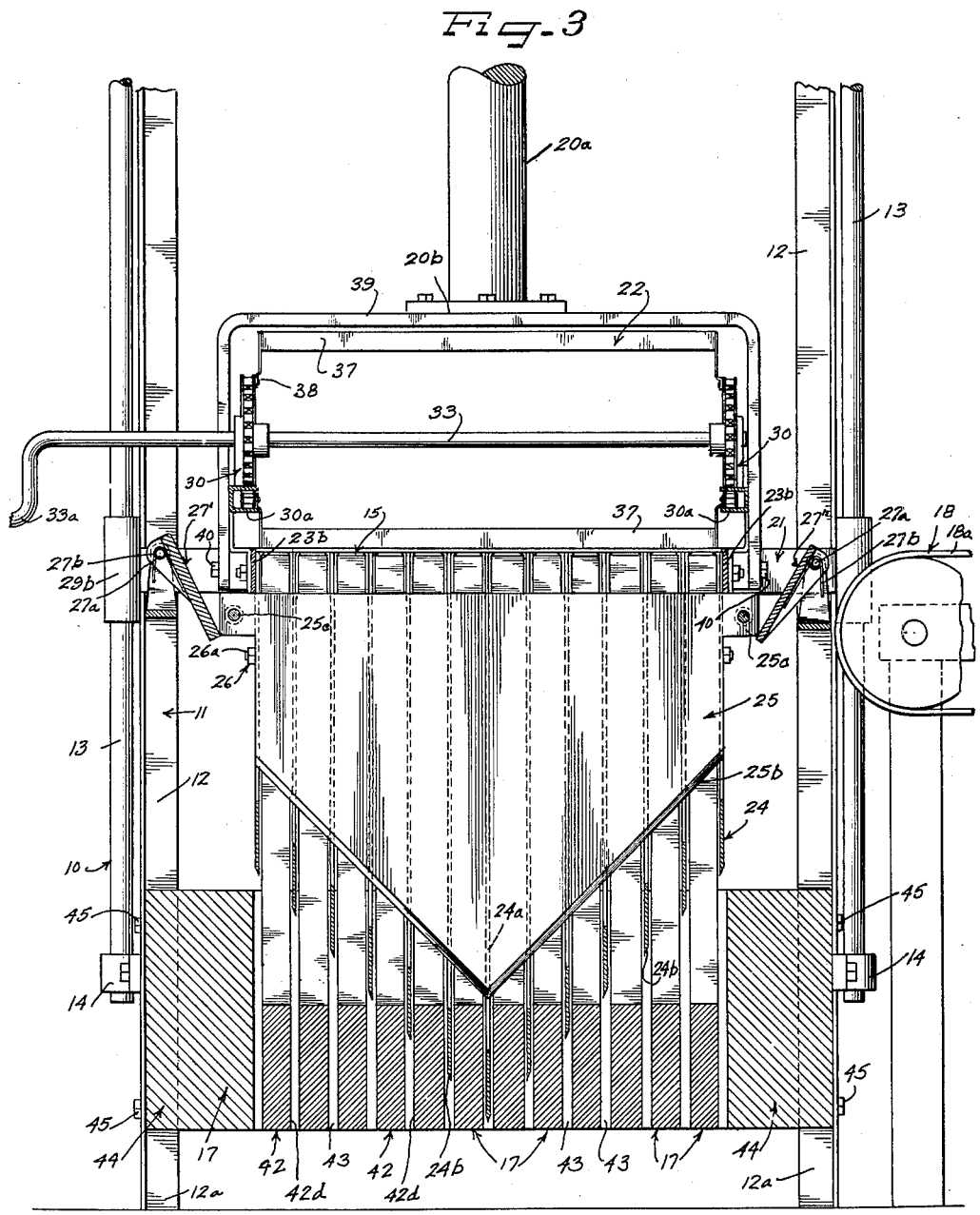
FIGURE 3 is an enlarged fragmentary front view similar to FIGURE 1 only with parts broken away and shown in section and with the knife structure shown in a closed position.
Figure 4:
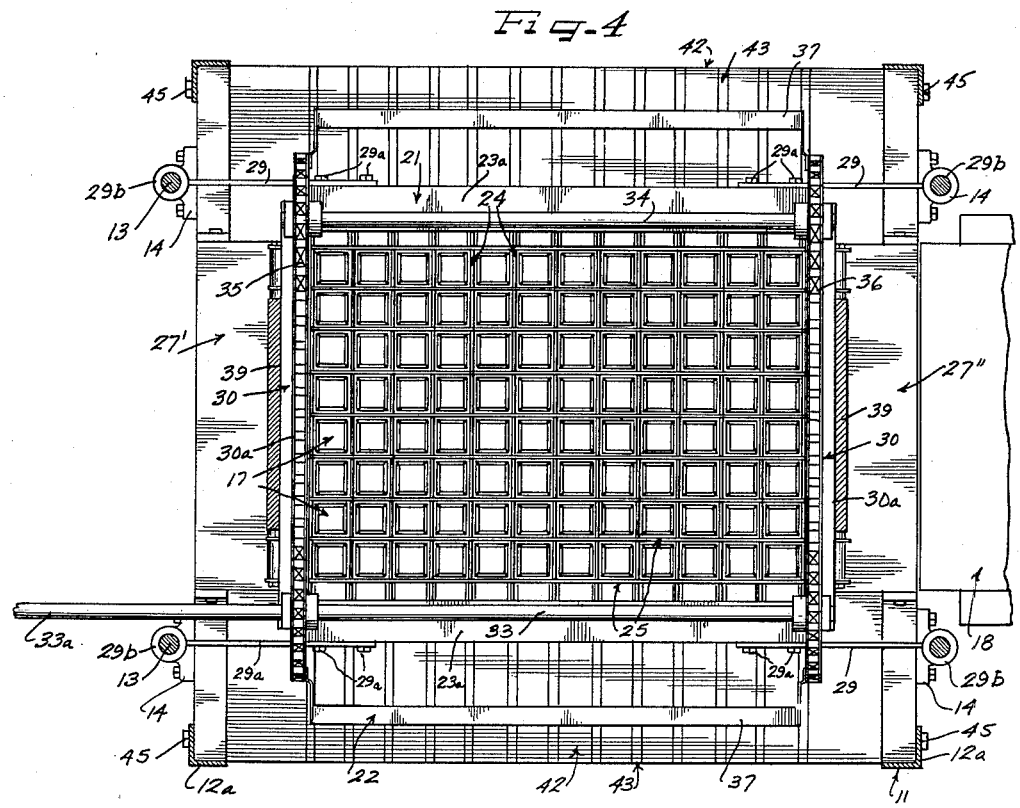
FIGURE 4 is an enlarged fragmentary cross-sectional view taken on the line IV—IV looking in the direction indicated by the arrows, as seen in FIGURE 1.

The I-shaped sweeper mounting brackets 30, 30 each include a channelled stem bracket portion 30a which comprises bracket chain guide means to assist in guiding the movement of the flights 37 across the cutting area 15 (FIGURE 3).

A U-shaped carriage mounting bracket 39 overlies the carriage frame member 23 and is connected by fasteners 40 in assembly with the carriage frame member 23. As was previously described, the piston rod 20a is bolted to the U-shaped carriage mounting bracket 39 at 20b to enable the carriage frame member 23 and the elements mounted thereon to be moved relative to the cutting area 15.

Figure 5:
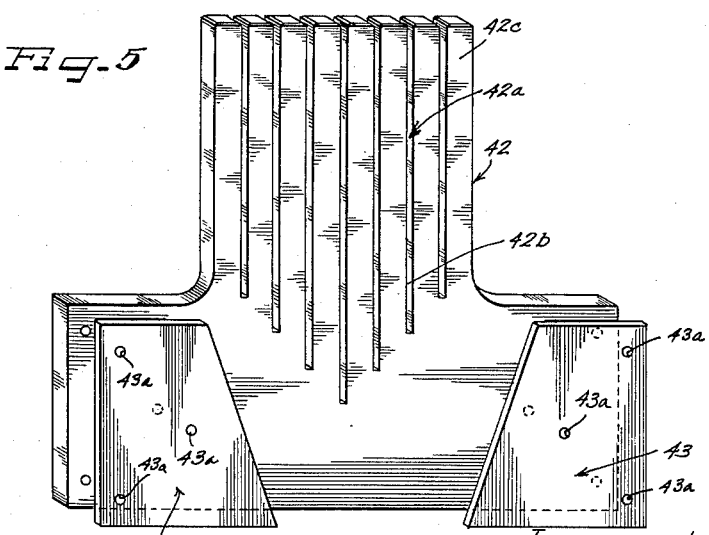
FIGURE 5 is an enlarged detail view of a portion of the guide structure disposed below the cutting area, the upper area of which defines a segment of the cutting area.

The blade guide means or structure 17 comprises a series of T-shaped blade guide blocks 42 (FIGURE 5) for guiding the movement of the longitudinal and the transverse knives 24 and 25 across the cutting area 15 to minimize any tendency of the blades to bend as they are projected against and through the frozen meat slab 19. The top edge area of the stem of the T comprises the cutting area 15. The stem of T on each of the guide blocks is provided with a grooved guide block area 42a for receipt of the transverse blades 25. The grooved guide area includes a plurality of grooves 42b having staggered depths each corresponding to the depth of the particular transverse blade 25 which is adapted to be engaged therein.

Suitably fastened at 43a to the blade guide blocks 42 on opposite sides thereof (FIGURE 5) are guide block spacer elements 43 which operate to space the blade guide blocks 42 and provide a longitudinal groove or guide or chute area 42c defined by opposite sides 42d, 42d of the blocks 42. The chute area 42c also provides passages through which any meat particles dislodged from the slab 19 during the meat cutting operation may be discharged from the guide structure 17 on to the ground surface S.

End guide blocks 44, 44 are disposed in abutment against the end spacer elements 43 and suitable fasteners 45 are provided to secure the blade guide block structure in assembly with the vertical frame members or posts 12a (FIGURE 3).

Operation

The operator may operate a control to cause the conveyor 18 to operate and move the slab of frozen meat carried on its endless conveyor belt 18a towards the cutting area until the end of the slab 19 is engaged against the shelf member (FIGURE 1) at the left side of the cutting area 15 at which time the conveyor may be shut off.

The operator may then open a control valve to allow fluid to flow through the hydraulic cylinder 20 to reciprocate the carriage member 23, the sweeper structure 22 and the knife structure 16. By this procedure the knives 24 and 25 may be projected through the frozen meat slab 19 with the longitudinal and transverse knives 24 and 25 being directed into the grooved areas 42a and 42c. During the cutting operation it will be noted that it is carried out in a staggered manner whereby the center knife 24a makes the first cut whereupon the meat is displaced away from the blade 24a on opposite sides thereof whereupon successive staggered longitudinal blade edges 24b are projected into the meat. By staggering the blade edges, space or clearance is provided for the meat to be displaced incident to the entry of each knife edge into the meat. The knife edges 25b operate in a similar manner and it will be noted that before the slab is completely divided into strips center areas of the meat are being cubed or cut in a transverse direction as compared to the initial cuts made by the longitudinal blades 24.

As the meat slab is divided into pieces, the knives or blades are moved completed through the meat so that the operator may operate the crank 33a to sweep the cutting area 15 free of the cut pieces of frozen meat which preferably may comprise rectangular pieces such as cubes and the like. During the sweeping operation, the sweeper flights 37 move at right angles to the direction of movement of the conveyor belt 18a and the cut meat pieces may be dumped into a basket or chute or the like at one side of the machine. Just prior to the commencement of the sweeping operation, the guide members 27 are pivoted on their pivots 27a to enable the knife structure 16 to be disposed below the cutting area 15 so sweeper flights 37 may sweep the cutting area clear of the cubed meat pieces.

The knife structure may be then retracted from cutting position to normal position above the cutting area 15. When the blade extensions 25c are disengaged from the guide members springs 27b are provided to return them to normal horizontal position.

It will be understood that modifications and variations may be effected without departing from the scope of the novel concepts of the present invention.

I claim as my invention:

1. In a meat cutting machine for cutting frozen slab of meat into a series of cube-like pieces, a frame structure, frozen meat cutting means mounted on the frame and movable vertically relative to the frame, and the machine having a cutting area normally below said frozen meat cutting means, the frozen meat cutting means including a first series of cutting elements being disposed in longitudinal vertical planes relative to one another and a second series of cutting elements being disposed in transverse vertical planes relative to one another and with the horizontal and the transverse vertical planes of the elements disposed in criss-crossing relation permitting the frozen slab to be cut into a series of cube-like pieces as the cutting elements are moved vertically across the cutting area, the first and second series of cutting elements being vertically stacked with respect to one another and having cutting edges crisscrossed vertically of one another and with all of the cutting elements connected together and movable in unison together for converting a frozen meat slab into cube-like pieces, said cutting elements being retractable in unison together out of engagement with the frozen cube-like pieces.

2. In a meat cutting machine for cutting frozen slab of meat into a series of cube-like pieces, a frame structure, frozen meat cutting means mounted on the frame and movable vertically relative to the frame, the machine having a cutting area normally below said frozen meat cutting means, the frozen meat cutting means including a first series of cutting elements being disposed in longitudinal vertical planes relative to one another and a second series of cutting elements being disposed in transverse vetrical planes relative to one another and with the horizontal and the transverse vertical planes of the elements disposed in criss-crossing relation permitting the frozen slab to be cut into a series of cube-like pieces as the cutting elements are moved vertically across the cutting area, the first and second series of cutting elements being vertically stacked with respect to one another and having cutting edges crisscrossed vertically of one another and with all of the cutting elements connected together and movable in unison together for converting a frozen meat slab into cube-like pieces, said cutting elements being retractable in unison together out of engagement with the frozen cube-like pieces and sweep means for sweeping the cutting area of the cube-like pieces prior to the cutting of another slab of meat.

3. In a meat cutting machine for cutting frozen slab of meat into a series of cube-like pieces, a frame structure, a slidable carriage frame mounted on the frame structure, a first series of cutting elements carried on the slidable carriage frame and with the first series of cutting elements being disposed in longitudinal vertical planes relative to one another and a second series of cutting elements carried on the slidable carriage frame and with the second series of cutting elements being disposed in transverse vertical planes relative to one another, the horizontal and the transverse vertical planes of the cutting elements being disposed in criss-crossing relation permitting a frozen slab to be cut into a series of cube-like pieces as the cutting elements are moved vertically across a cutting area, the cutting elements lying underneath the cutting area following the cutting operation leaving the cube-like pieces resting on the cutting area overlying the cutting elements, and meat sweeper means mounted on top of said slidable frame structure for sweeping the cube-like pieces away from the cutting elements prior to the return of the cutting elements into normal position above the cutting area.

4. In a meat cubing machine for cubing slices of frozen meat, conveyor structure on said machine for conveying the meat to a cutting area, and frozen meat slicing means on said machine overlying the cutting area, the frozen meat slicing means comprising a series of transverse knives and a series of longitudinal knives, both series of the knives having staggered cutting edges which are disposed to permit frozen segments of the frozen meat chunk being sliced to be cut apart prior to the slicing of other frozen segments of the frozen meat chunk thereby providing clearance for the passage of the knives through the frozen meat chunk, each of said knives being generally V-shaped and having a beveled cutting edge ground in a direction which is disposed to accomplish a lateral spreading, slitting, and displacement of the frozen meat chunk prior to the entry of an outer adjacent knife into the frozen meat chunk and with the knives in each of the series being staggered and arranged in the shape of a V the lowermost cutting edge in each series being beveled on both sides, and meat sweeper means mounted above said series of transverse and longitudinal knives for sweeping the cube-like pieces of frozen meat away from said knives.

5. In a meat cubing machine for cubing slices of frozen meat, conveyor structure on said machine for conveying the meat to a cutting area, and frozen meat slicing means on said machine overlying the cutting area, the frozen meat slicing means comprising a series of transverse knives and a series of longitudinal knives, both series of the knives having staggered cutting edges which are disposed to permit frozen segments of the frozen meat chunk being sliced to be cut apart prior to the slicing of other frozen segments of the frozen meat chunk thereby providing clearance for the passage of the knives through the frozen meat chunk, each of said knives being V-shaped and having a beveled cutting edge ground in a direction which is disposed to accomplish a lateral spreading, slitting and displacement of the frozen meat chunk prior to the entry of an outer adjacent knife into the frozen meat chunk and with the knives in each of the series being staggered and arranged in the shape of a V, the cutting edge of the blades at the bottom of each of the V's being beveled on both sides.

6. Frozen meat cutting means comprising a series of transverse knives and a series of longitudinal knives, connecting means connecting said knives together in assembly, both series of the knives having staggered cutting edges which are disposed to permit frozen segments of the frozen meat chunk being sliced to be cut apart prior to the slicing of other frozen portions of the frozen meat chunk thereby providing clearance for the passage of the knives through the frozen meat chunk, each of said knives being V-shaped and having a beveled cutting edge and with the knives in each of the series being staggered and arranged in the shape of a V.

7. Frozen meat cutting means comprising a series of transverse knives and a series of longitudinal knives, connecting means connecting said knives together in assembly, both series of the knives having staggered cutting edges which are disposed to permit frozen segments of the frozen meat chunk being sliced to be cut apart prior to the slicing of other frozen portions of the frozen meat chunk thereby providing clearance for the passage of the knives through the frozen meat chunk, each of said knives in each of the series being staggered and arranged in the shape of a V, the cutting edge of the blades at the bottom of each of the V's being beveled on both sides and with the other beveled cutting edges in each series facing away from the associated cutting edge which is beveled on both sides.

8. Frozen meat cutting means comprising a series of transverse knives and a series of longitudinal knives, connecting means connecting said knives together in assembly, both series of the knives having staggered cutting edges which are disposed to permit frozen segments of the frozen meat chunk being sliced to be spread apart prior to the slicing of other frozen portions of the frozen meat chunk thereby providing clearance for the passage of the knives through the frozen meat chunk, the transverse knives having a channelled area and the longitudinal knives being telescoped within the channelled area to provide a compact assembly.

9. A frozen meat cubing machine comprising a cutting table-like area on the machine and means for cubing a slab of frozen meat into pieces of uniform size comprising a knife structure on the machine including longitudinal and transverse rows of knives disposed generally at right angles with respect to one another, the longitudinal and transverse knives being movable through the cutting area for cutting a frozen slab of meat into cube-like pieces, each of the knives having beveled cutting edges with the cutting edges on the longitudinal rows of knives being disposed between the cutting area and the cutting edges on the transverse rows of knives, and sweeper means carried on the knife structure, the sweeper means including sprockets connected to the knife structure, link chains on the sprockets and flights carried between the chains and movable through an orbit to sweep the meat cutting area free of cut meat pieces.

10. In a meat cubing machine for cubing slices of frozen meat, conveyor structure on said machine for conveying the meat to a cutting area, and slicing means on said machine overlying the cutting area, the slicing means comprising a series of transverse knives and a series of longitudinal knives, both series of the knives having staggered cutting edges which are disposed to permit frozen segments of the frozen meat chunk being sliced to be spread apart prior to the slicing of other frozen segments of the frozen meat chunk thereby providing clearance for the passage of the knives through the frozen meat chunk, and means underlying said knives for supporting the frozen meat being cut and into which said knives are telescoped as the frozen meat is being cut to prevent said knives from bending with respect to one another, each of the cutting knives in each of the series being staggered and arranged generally in the shape of a V, the cutting edge of the knives at the bottom of each of the V's being beveled on both sides and with the other beveled cutting edges in each series facing away from the associated cutting edge which is beveled on both sides.

11. In a meat cutting machine for cutting frozen slabs of meat into a series of cube-like pieces, a frame structure, frozen meat cutting means mounted on the frame structure and movable vertically relative to the frame structure including a series of knives for progressively cutting the frozen meat in a criss-crossing relation with the central area of the slab being cut in advance of surrounding areas of the slab, guide means mounted on the frame structure beneath the knives having criss-crossing grooved areas for receiving the knives and to minimize deflection of the knives as the knives are passed through the frozen meat, and meat sweeper means for sweeping the cube-like pieces off of a top surface of said guide means prior to the retraction of the knives out of said grooves.

References Cited in the file of this patent

UNITED STATES PATENTS

| | | |
|---|---|---|
| 824,587 | Ruehs et al. | June 26, 1906 |
| 1,943,113 | Daum | Jan. 9, 1934 |
| 2,023,810 | Horner | Dec. 10, 1935 |
| 2,487,431 | Floyd | Nov. 8, 1949 |
| 2,538,430 | Shadduck | Jan. 16, 1951 |
| 2,721,594 | Warren et al. | Oct. 25, 1955 |
| 2,753,907 | Schmidt et al. | July 10, 1956 |
| 2,811,997 | Schmidt et al. | Nov. 5, 1957 |
| 2,941,560 | McCaffery | June 21, 1960 |

FOREIGN PATENTS

| | | |
|---|---|---|
| 468,492 | Germany | Nov. 14, 1928 |
| 805,962 | France | Sept. 14, 1936 |